Aug. 16, 1949.  A. DREYER  2,479,104
AXIAL EXPANSION COMPENSATOR FOR PIPE CONDUITS
Filed Aug. 13, 1945
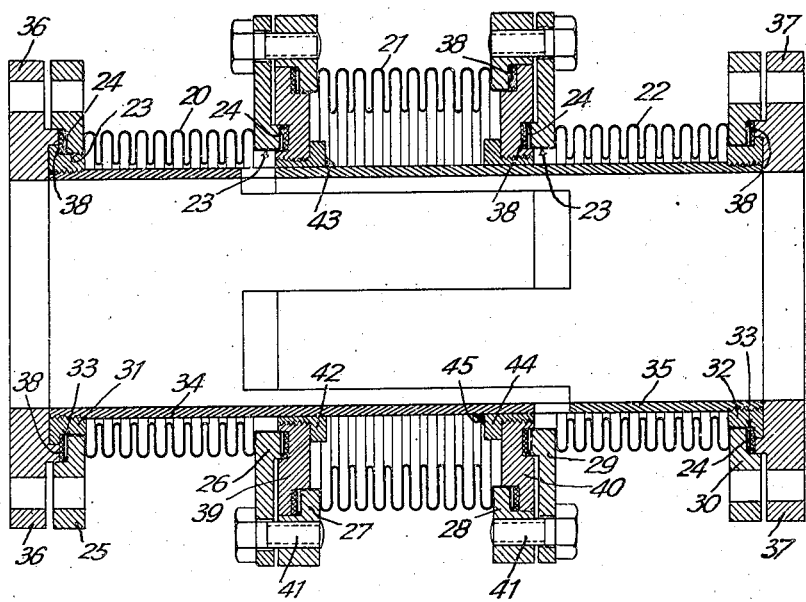
Inventor:
Albert Dreyer
by Sommer & Young
Attorneys Patented Aug. 16, 1949

2,479,104

UNITED STATES PATENT OFFICE 2,479,104

AXIAL EXPANSION COMPENSATOR FOR PIPE CONDUITS

Albert Dreyer, Lucerne, Switzerland, assignor to Metallschlauchfabrik A. G., Lucerne, Switzerland Application August 13, 1945, Serial No. 610,631
In Switzerland August 29, 1944

1 Claim. (Cl. 285—90)

This invention relates to axial expansion compensators for pipe conduits.

The invention has for its particular object to improve and simplify the construction of relieved axial expansion compensators for pipe conduits that are provided with three chambers which adjoin each other in the axial direction of the pipe conduit and are each closed towards outside by a bellows-like or corrugated resilient tube element, the central chamber of which has a larger outer diameter than the other two chambers and the walls of which are arranged in relatively displaceable relation to each other, in such manner, that as the end walls of the extreme chambers are forced towards each other the latter chambers are reduced in length, and the central chamber is correspondingly inceased in length, chamber is correspondingly inceased in length, and vice versa, when the extreme chambers are expanded the central chamber is correspondingly decreased in length.

Up to the present considerable difficulty was encountered in assembling such compensators in respect of the joining of the ends of the individual resilient corrugated pipe elements with each other as well as in regard to the slide like guide pipes.

The conventional constructions are entirely unsatisfactory particularly insofar as the individual resilient corrugated tube elements of which the compensator is composed could only be tested after the whole apparatus had been assembled. If untight portions were then discovered the whole compensator had to be completely disassembled again and, as the joints had been closed by hard soldering or welding, detaching of the compensator was in most cases impossible without damage to the resilient pipe elements, that is, replacing these expensive pipe elements, and only the flanges could be put into use again in most cases.

A further drawback attendant to the conventional constructions consists in that the physical properties of the resilient tube elements are altered at the terminal corrugations which fact has a detrimental effect on the life of these elements. By influence of the high hard soldering and welding temperatures the terminal corrugations had been annealed so as to become unelastic and, apart from this, detrimental stressing of the material ensued. Unfortunately the portions at which the hard soldering or welding had to be effected are situated exactly in the zones of maximum stressing of the resilient corrugated tube element, namely, at the furrows between ridges or at the said ridges.

Particularly great difficulty was encountered in hard soldering or welding of resilient manifold walled corrugated tube elements of rustproof steel, due to the risk of the individual thin layers getting scorched prior to the welding taking place at all, owing to the intense heat which is required for fusing the thick flanges in position.

An improved construction of such a relieved axial expansion compensator for pipe conduits is obtained, according to the present invention in that the resilient corrugated tube elements on the three chambers are provided at both ends with a border by means of which they are connected with separate flanges which are detachably connected to rings, in such manner, that the compensator can be disassembled into its constituent parts.

By this means separate resilient corrugated tube elements which have become untight can be exchanged in simple manner.

An embodiment of the present invention is illustrated in a longitudinal section, by way of example only, in the accompanying drawing.

The compensator as shown is provided with three resilient corrugated tube elements 20, 21 and 22 which are provided at both ends with bent up borders 23 of U-shaped cross section the outer rim like portion of which is strengthened by a crimped edge 24. In the borders 23 separate flanges 25, 26, 27, 28, 29 and 30 are retained. The two outermost flanges 25, 30 are pushed on a setback 33 on associated fastening rings 31 and 32 respectively. The rings 31, 32 are threadedly connected to either of two relatively slidably interengaging tubes 34, 35. The numerals 36 and 37 refer to connecting flanges of the pipe conduits to be connected with each other. The flanges 36 and 37 interengage by means of tongues with grooves which are formed between setbacks on the flanges 25 and 30 respectively and the corresponding fastening rings 31 or 32. Between the crimped edges 24 on the borders 23 on either of the flanges 25 or 30, and either of the rings 31 or 32 and the connecting flanges 36 and 37 respectively an annular packing member 38 is inserted in every case which is made of a resilient material, whereby in screwing together the flanges 25, 36 and 30, 37 respectively the resilient corrugated tube elements provide a firm seal apart from a secure connection.

The intermediate flanges 26, 27 are detachably secured to a fastening ring 39 and the flanges 28, 29 to a fastening 40, the rings 39 and 40 serving for the reception of the flanges 27 and 28 respectively and the flanges 26 and 29 respectively. Between the said setbacks and grooves respectively and the crimped edges 24 on the borders 23 packing rings 38 are also provided so that in bolting together the flanges 26 and 27 on one hand and the flanges 28 and 29 on the other hand by tap bolts 41 a tight seal is obtained.

The fastening ring 39 is threadedly connected with a ring 42 which is welded together with the tube 34 which is displaceable in the manner of a slide at a point 43. In the same way the fastening ring 40 is threadedly connected with a ring 44 which is connected to the second tube 35 which is displaceable in the manner of a slide at a point 45 by welding. By welding together the ends of the tubes 34 and 35 with the rings 42 and 44 respectively said tube ends are strengthened.

After the three resilient corrugated tube elements 20, 21, 22 have been equipped with the respective separate flanges 25, 26, 27, 28, 29 and 30 the assembling of the compensator is effected as follows:

The slide like tubes 34 and 35 are slid into interengagement with each other, whereupon the respective rings 42 or 44 are welded thereto. Thereupon either of the intermediate fastening rings 39 or 40 are screwed to the associated rings 42 or 44 and then the resilient corrugated tube element 21 is slid in position and the other fastening rings 40 or 39 are screwed to the respective rings 44 or 42. Afterwards the resilient corrugated tube elements 20 and 22 are pushed in position and the fastening rings 31 and 32 respectively are screwed home. Finally, the flanges 26, 27 and 28, 29 respectively are tightly screwed home by means of the bolts 41.

Disassembling of the compensator can be carried out in reversed sequence at any time.

As will be readily seen the instant compensator is provided with three collateral chambers each of which is closed towards outside by the respective resilient corrugated tube element 20, 21 or 22 the central chamber of which has a greater outer diameter than the two other chambers. The chamber walls formed by the respective flanges 25, 26, 27, 28, 29 or 30 and the rings 31, 32, 39, 40, 42 or 44 are relatively displaceable in the manner of slides by virtue of being connected to the tubes 34 and 35 so that in pushing the end walls of the outer chambers towards each other the latter are accordingly decreased in length while the central chamber is increased in length, and vice versa, in pulling apart the walls of the outer chambers these are increased in length, whereas the central chamber is accordingly contracted.

I claim:

In an axial expansion compensator for longitudinally variable pressure fluid conduits, in combination, three axially aligning walled chambers, two terminal annular fluid passage flanges respectively adjoining the outer ends of the end chambers substantially coaxially therewith, a bellows-like tube element forming an enclosure surrounding each said chambers, the central said chamber having a larger outer diameter than said end chambers, and the walls of said chambers being arranged for relative axial displacement for compensating any length variations of said conduit, means for detachably connecting the end bellows-like elements to the respective terminal flanges, said flanges and connecting means being formed with tongue and groove joints which the ends of the respective bellows-like elements are seated, screw means located exteriorly of the said joints for drawing said flanges and connecting means together to grip the ends of the bellows-like elements in said joints, fastening rings mounted on the walls forming said chambers at the inner ends of the outer of said chambers, pairs of connecting rings on opposite sides of the respective fastening rings, said fastening rings and connecting rings being formed with tongue and groove joints in which the ends of the centrally located bellows-like element and the inner ends of the end bellows-like elements are located, and screw means located externally of the said latter joints for drawing the said connecting rings together to press the respective ends of the bellows-like elements into the latter said tongue and groove joints.

ALBERT DREYER.

REFERENCES CITED

The following references are of record in the file of this patent:

UNITED STATES PATENTS

| Number | Name | Date |
|---|---|---|
| 1,666,637 | Aldrich et al. | Apr. 17, 1928 |
| 2,014,355 | Hussman | Sept. 10, 1935 |

FOREIGN PATENTS

| Number | Country | Date |
|---|---|---|
| 215,472 | Switzerland | June 30, 1941 |